US012645211B2

(12) United States Patent
Schwarz et al.

(10) Patent No.: US 12,645,211 B2
(45) Date of Patent: Jun. 2, 2026

(54) METHOD FOR TRAINING A PLANAR TRANSPORT DEVICE, PLANAR TRANSPORT DEVICE THAT CAN BE TRAINED BY SUCH A METHOD, AND PRODUCTION AND/OR TRANSPORT MACHINE WITH SUCH A PLANAR TRANSPORT DEVICE

(71) Applicant: Syntegon Technology GmbH, Waiblingen (DE)

(72) Inventors: Sebastian Schwarz, Neusitz (DE); Marcus Kleinert, Wallhausen (DE); Maik Täger, Fichtenau (DE); Florian Polzin, Wallhausen (DE)

(73) Assignee: Syntegon Technology GmbH, Waiblingen (DE)

( * ) Notice: Subject to any disclaimer, the term of this patent is extended or adjusted under 35 U.S.C. 154(b) by 341 days.

(21) Appl. No.: 18/449,959

(22) Filed: Aug. 15, 2023

(65) Prior Publication Data

US 2024/0061411 A1 Feb. 22, 2024

(30) Foreign Application Priority Data

Aug. 16, 2022 (DE) ..................... 10 2022 120 633.5

(51) Int. Cl.
*G05B 19/42* (2006.01)
*B65G 65/00* (2006.01)

(52) U.S. Cl.
CPC ....... *G05B 19/4207* (2013.01); *B65G 65/005* (2013.01); *B65G 2203/0283* (2013.01); *G05B 2219/36184* (2013.01)

(58) Field of Classification Search
CPC ...... G05B 19/4207; G05B 2219/36184; G05B 19/423; B65G 65/005; B65G 2203/0283; H02K 41/031
(Continued)

(56) References Cited

U.S. PATENT DOCUMENTS

| | | |
|---|---|---|
| 2017/0050332 A1 | 2/2017 | Bauer et al. |
| 2020/0130178 A1 | 4/2020 | Colasanto et al. |

(Continued)

FOREIGN PATENT DOCUMENTS

| | | |
|---|---|---|
| DE | 102014106400 A1 | 11/2015 |
| DE | 102019001207 | 8/2019 |

(Continued)

OTHER PUBLICATIONS

Canadian Patent Office Action for Application No. 3209333 dated Mar. 21, 2025 (6 pages).

(Continued)

*Primary Examiner* — Jigneshkumar C Patel
(74) *Attorney, Agent, or Firm* — Michael Best & Friedrich LLP

(57) ABSTRACT

A method for teaching a planar transport device, in which an operating behavior of at least one handling element of the planar transport device, which is configured as an electro-dynamically movable mover and is configured for handling products, is taught by an operator interaction of an operator, which is designed differently from a manual writing of a programming command. The operator interaction takes place directly, preferably free of an additional operator input device, at the handling element in order to specify the operating behavior of the handling element.

10 Claims, 4 Drawing Sheets

(58) Field of Classification Search
USPC ........................................................ 700/86
See application file for complete search history.

(56) References Cited

U.S. PATENT DOCUMENTS

| | | | | |
|---|---|---|---|---|
| 2021/0316449 | A1 | 10/2021 | Wang et al. | |
| 2021/0328493 | A1* | 10/2021 | Luthe | H02K 41/031 |
| 2023/0006517 | A1 | 1/2023 | Bentfeld et al. | |
| 2023/0185312 | A1* | 6/2023 | Hauer | H02K 41/031 |
| | | | | 700/230 |
| 2024/0083022 | A1* | 3/2024 | Utsumi | B25J 9/1664 |
| 2024/0240969 | A1 | 7/2024 | Tatei et al. | |
| 2024/0266979 | A1* | 8/2024 | Beckhoff | H02K 41/031 |

FOREIGN PATENT DOCUMENTS

| | | |
|---|---|---|
| DE | 102019134794 | 6/2021 |
| DE | 112018002565 | 7/2021 |
| DE | 202021103637 | 9/2021 |
| DE | 102021107532 | 10/2021 |
| DE | 102020006839 | 5/2022 |
| EP | 3883124 A1 | 9/2021 |
| JP | 7046290 B1 | 4/2022 |
| WO | 2019002918 A1 | 1/2019 |
| WO | 2021019054 A1 | 2/2021 |
| WO | 2022015764 A1 | 1/2022 |

OTHER PUBLICATIONS

Aude Billard et al: "Robot Programming by Demonstration", ISBN: 978-3-540-23957-4, dated May 20, 2008, pp. 1371-1394 (25 pages).
European Patent Office Search Report for Application No. 23191356.7 dated Jan. 19, 2024 (14 pages including English translation).
Office Action mailed for German Patent Application No. 102022120633.5 mailed on Mar. 15, 2023 (English Translation, 11 pages).
Wandlebots GMBH, TracePen, "Wandlebots Teaching Demo" <https://www.youtube.com/watch?v=gFMniEvp5G4&t=12s> published Mar. 21, 2023.
European Patent Office Action for Application No. 23191356.7 dated Dec. 23, 2025 (8 pages including English machine translation).

* cited by examiner

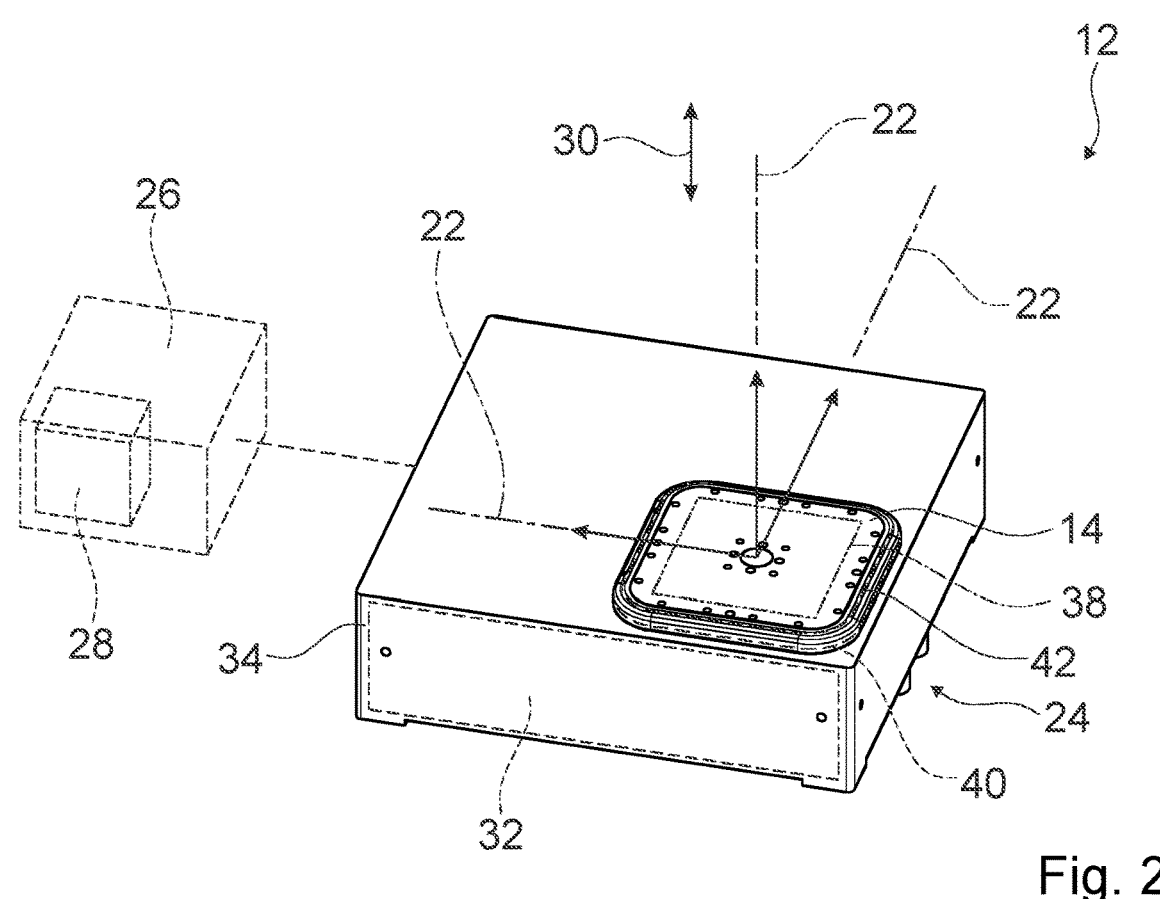
Fig. 2
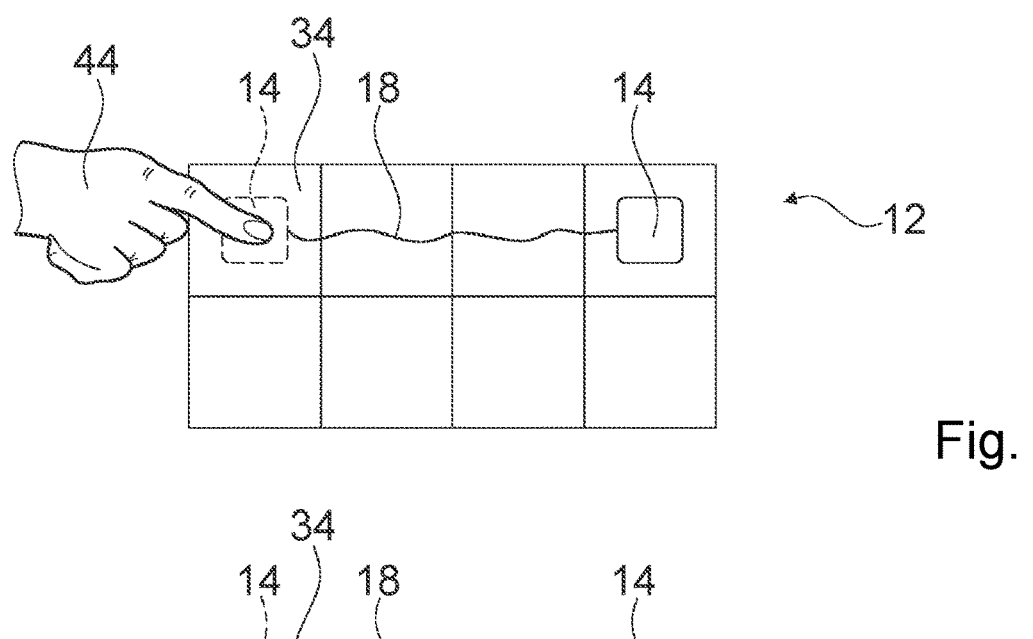
Fig. 3a
Fig. 3b

METHOD FOR TRAINING A PLANAR TRANSPORT DEVICE, PLANAR TRANSPORT DEVICE THAT CAN BE TRAINED BY SUCH A METHOD, AND PRODUCTION AND/OR TRANSPORT MACHINE WITH SUCH A PLANAR TRANSPORT DEVICE

CROSS REFERENCE TO RELATED APPLICATION

This application is based on and incorporates herein the German patent application DE 10 2022 120 633.5, filed on Aug. 16, 2022.

BACKGROUND

The invention relates to a method for teaching a planar transport device, a planar transport device which can be taught by means of the method, and a production and/or transport machine comprising such a planar transport device.

Methods for teaching handling devices are already known, for example from DE 10 2021 107 532 A1, DE 10 2020 006 839 A1, DE 10 2019 134 794 B4, DE 10 2019 001 207 A1 and DE 11 2018 002 565 B4. Furthermore, a method is already known, for example, from the company Wandelbots GmbH, in which a handling device is taught by means of a separate teaching tool—a so-called TracePen—by recording operator interactions of an operator via the separate teaching tool and converting them into an operating behavior of the handling device. The operator interactions are not performed directly on the handling device in order to specify the operating behavior of the handling device, which can lead to deviations and inaccuracies between the operator interaction and the operating behavior derived therefrom, in particular undesirable deviations and inaccuracies.

A method for teaching a handling device in the form of an industrial robot is also already known from DE 20 2021 103 637 U1, wherein an operating behavior of at least one handling element of the handling device, in particular of a head and clamping jaws of the industrial robot, which is or are configured for handling products, is taught by means of an operator interaction of an operator, which is in particular designed differently from a manual writing of a programming command. The operator interaction takes place, in particular directly, preferably free of an additional operator input device, on the handling element in order to specify the operating behavior of the handling element.

The object of the invention is in particular to provide a generic method, a generic planar transport device and/or a generic production and/or transport machine having improved properties with regard to precision and operator comfort. The object is achieved according to the invention.

SUMMARY

The invention is based on a method for teaching a planar transport device, wherein an operating behavior of at least one handling element of the planar transport device, which is designed as an electrodynamically movable mover and is configured for handling products, is taught by means of an operator interaction, which is designed in particular differently from a manual writing of a programming command, of an operator.

It is proposed that the operator interaction takes place directly, preferably free of an additional operator input device, at the handling element in order to specify the operating behavior of the handling element. By means of the embodiment according to the invention, an operator-friendly teaching method for one or more handling element(s) of a handling device designed as a planar transport device can be advantageously achieved. An operator can advantageously specify movement sequences or movement distances of the handling element simply and quickly on the handling element itself, in particular without having to have special programming skills for this. Advantageously, a teaching method that can be carried out intuitively can be made possible. Advantageously, a simple adaptability of the operating behavior of the handling element can be achieved. In particular, adjustments to the operating behavior of the handling element can be made easily and quickly during ongoing operation, since, for example, an operator can directly change the operating behavior of the handling element by direct operator interaction when an undesirable action of the handling element is detected.

The handling device is preferably designed as a planar transport device, which in particular comprises an electrodynamic conveyor unit. However, it is also conceivable that the handling device has another design that appears useful to a person skilled in the art, such as a design as a robot device that has at least one multi-axis robot arm, as an autonomous transport vehicle device that has at least one autonomously moving transport vehicle, or the like. Preferably, the handling device configured as a planar transport device has an embodiment already known at least substantially to a person skilled in the art. The handling device preferably comprises a plurality of, in particular horizontally aligned, movement surface elements, which are equipped with electromagnetic drive units and are connected to one another, in particular in order to form together a planar movement plane. The handling device preferably comprises a plurality of handling elements, in particular movable relative to the movement surface elements. The handling elements are preferably designed as movers which are movable relative to the movement surface elements, in particular without contact, in particular as a result of a cooperation of permanent magnets of the movers with the electromagnetic drive units of the movement surface elements. Preferably, the permanent magnets of the movers and the electromagnetic drive units together form the electrodynamic transport unit or are at least part of the electrodynamic transport unit. In particular, the handling device designed as a planar transport device can detect and evaluate a position of the individual movers relative to the movement surface elements in a manner already known to a person skilled in the art in order to implement a control or regulation of a movement of the movers. With regard to a basic mode of operation and a basic design of the handling device designed as a planar transport device, reference is made, for example, to the product XPlanar from the company Beckhoff Automation GmbH & Co. KG or to the product XBot® from the company Planar Motor Inc.

The operational behavior of the handling element or the handling elements preferably represents a behavior of the handling element or the handling elements during regular operation of the handling device, in which products are handled by means of the handling element or the handling elements. A handling of products can be, for example, a transport, a processing, a weighing, a measuring or the like of products. By means of the mover or the movers of the handling device designed as a planar transport device, products can be handled in a particularly flexible manner. For handling products, at least one product pick-up unit is preferably arranged on each mover. Alternatively or additionally, a surface of the mover facing away from the movement surface element during operation of the handling device forms a product support surface on which products to be handled can be arranged. Preferably, the handling device is configured for transporting products. For example, it is conceivable that the handling device is configured for transporting products between individual work stations of a production and/or transport machine comprising the handling device. The handling device may be configured for an ordered transport, such as for a realization of a row formation or the like, and/or for an unordered transport. The term "configured" is in particular to mean specially structured, specially programmed, specially designed and/or specially equipped. The fact that an object is configured for a certain function, is in particular to mean that the object fulfills and/or executes this certain function in at least one application and/or operating state.

Furthermore, it is proposed that a movement of the handling element along a movement path and/or around a movement axis, in particular of the handling element, in particular a manual movement, preferably performed by the operator, is detected by means of a sensor unit of the handling device, which is in particular arranged at least partially on the handling element, and is converted by means of a control or regulation unit of the handling device into an electronic command, which is stored in a memory unit of the control or regulation unit as part of an operating program for a control or regulation of the operating behavior of the handling element. A "control or regulation unit" shall be understood in particular to mean a unit having at least one control electronics. A "control electronics" shall be understood in particular to mean a unit comprising a processor unit and comprising a memory unit as well as comprising an operating program stored in the memory unit. Preferably, the handling element is moved directly by the operator, in particular by the operator moving the handling element by means of an extremity of the operator, in particular a hand or a finger, in particular relative to the movement surface element, preferably by the operator pushing, pulling, rotating, lifting and/or pressing down. Preferably, the operator interaction to a specification of the operational behavior is a movement of the handling element relative to the movement surface elements by the operator, wherein the operator preferably touches the handling element directly or indirectly, in particular via an auxiliary element. For example, a movement and/or a movement sequence of the handling element, which the handling element performs during regular operation, is/are taught, in particular in a teaching process, by means of an active movement of the handling element by the operator relative to the movement surface elements. The operator, in particular in the teaching process, for example by moving, in particular pushing or pulling, the handling element, can specify a movement path of the handling element, which the handling element travels during a regular operation. For example, the operator, in particular in the teaching process, by rotating the handling element around the movement axis, can specify a speed of the handling element with which the handling element moves along the specified movement path during regular operation. It is also conceivable that a fine adjustment of the movement path or the speed can be made by the operator tapping the handling element, in particular laterally, preferably aligned at least substantially parallel to a horizontal plane and/or a surface of the handling element and/or the movement surface elements. The expression "substantially parallel" here means, in particular, an alignment of a direction relative to a reference direction, in particular in a plane, wherein the direction has a deviation relative to the reference direction in particular smaller than 8°, advantageously smaller than 5°, and particularly advantageously smaller than 2°. Preferably, the operator directly contacts the handling element in order to move the handling element to a specification of an operating behavior, in particular to push, pull, turn, lift and/or press down the handling element relative to the movement surface element. Preferably, the operator interaction to a specification of an operating behavior corresponds to a pushing, a pulling, a turning, a lifting and/or a pressing down of the handling element by the operator. It is conceivable that the additional element that can be arranged on the handling element, such as a type of handle, guide rod or the like, is used to move the handling element. The additional element can be used for advantageous gripping and/or guiding of the handling element during the teaching process. Preferably, the additional element is not arranged on the handling element in a regular operation. The handling element may comprise a connection interface configured for a detachable mechanical connection to the additional element. The connection interface can be designed as a plug-in connection, as a screw connection, as a clamp connection, as a hook-and-loop connection, as a bayonet connection or as any other connection interface that appears reasonable to a person skilled in the art. Preferably, the connection interface is free of electronic and/or electrical contacts. The connection interface can be formed partially or completely by the product receiving unit or can be arranged on the handling element in addition to the latter. However, it is also conceivable that the additional element is arranged in a stowable manner on the handling element, for example as a result of a movable mounting of the additional element on the handling element. For example, the additional element can be movably mounted on the handling element in a foldable, pivotable, retractable or similar manner. Preferably, an operator interaction designed as manual movement of the mover is detected by means of the sensor unit of the handling device, preferably interpolated, and, in particular following the interpolation, is stored as a program command/operating command in the memory unit of the control or regulation unit. Preferably, the permanent magnets of the handling elements together with the electromagnetic drive units of the movement surface elements form part of the sensor unit. Preferably, a part of the control or regulation unit forms the sensor unit, in particular the part of the control or regulation unit that evaluates a change in the magnetic field between handling elements and the movement surface elements in order to determine a position of the handling element relative to the movement surface element, in particular to a plurality of the movement surface elements. However, it is alternatively or additionally conceivable that the sensor unit comprises a sensor element which is designed for a special detection of position data, such as an acceleration sensor, a rotation rate sensor or the like. By means of the design according to the invention, individual movement paths of the handling elements can be advantageously specified, which can be specified in a user-friendly manner, in particular without having to have special programming skills. Advantageously, as a result of the detection of the movement by means of the sensor unit, in particular directly on the handling element, particularly precise teaching can be made possible. Advantageously, a user-friendly teaching method for one or more handling elements of the handling device can be achieved.

It is further proposed that a movement of the handling element along a movement path and/or around a movement axis, in particular a manual movement, preferably performed by the operator, is detected by means of a sensor unit of the handling device, in particular the aforementioned sensor unit, in particular arranged at least partially on the handling element, and is interpolated by means of a control or regulation unit of the handling device, in particular the aforementioned control or regulation unit, in particular before storage as part of an operating program in a memory unit of the control or regulation unit, in particular the aforementioned memory unit. The control or regulation unit is preferably set up to compensate for deviations in predetermined movement paths, which are detected, for example, by a shaking of the operator during a movement of the handling element or the like, before storing the movement path. For example, the control or regulation unit automatically smooths a shaky course of a movement path mainly detected as a straight line or a shaky course of a movement path mainly detected as an arc or curve. Further optimizations of the detected movement paths that appear useful to a person skilled in the art are also conceivable. By means of the design according to the invention, particularly precise teaching can be advantageously made possible. It is advantageous that undesirable inaccuracies in movement paths can be compensated for simply, in particular automatically.

Furthermore, it is proposed that a teaching process is started or ended by a movement of the handling element, in particular a manual movement, preferably by the operator, in particular along a vertical direction, relative to a movement surface element of the planar transport device, which in particular comprises at least one electromagnetic drive unit, in particular of the movement surface element already mentioned above. It is conceivable that the operator moves the handling element as a whole along the vertical direction in order to start or end the teaching process, or that the operator moves the handling element only in an edge region of the handling element along the vertical direction in order to start or end the teaching process. When moving only an edge region of the handling element along the vertical direction, the handling element is preferably tilted as a result of the movement around an axis at least substantially parallel to the horizontal plane. Preferably, the handling element can assume a function of a type of operating button. Preferably, a movement of the handling element along the vertical direction is detected by means of the sensor unit and processed or evaluated by the control or regulation unit. By means of the embodiment according to the invention, a user-friendly teaching method for one or more handling element(s) of the handling device can be advantageously achieved. Advantageously, a teaching method can be implemented without additional input devices, in particular because largely all operator interactions can be carried out directly on the handling element. Advantageously, an intuitive teaching method can be made possible.

Furthermore, it is proposed that a change in a magnetic field, in particular in an electromagnetic field, is evaluated for a detection of position data of the handling element, which are used for a detection of a movement path of the handling element. Preferably, the evaluation of a change in the magnetic field is performed by the control or regulation unit. Preferably, the so-called AMR effect (anisotropic magnetoresistive effect) is used to detect the position data based on the change in the magnetic field. Preferably, the magnetic field generated by means of the electromagnetic drive units of the movement surface elements is changed as a result of a relative movement of the handling elements, each of which comprises a permanent magnet. The magnetic field generated by means of the electromagnetic drive units of the movement surface elements is preferably controlled, in particular monitored, by the control or regulation unit, in particular in a manner already known to a person skilled in the art. By means of the design according to the invention, a precise position detection can be realized advantageously. Existing components of the handling device can advantageously be used for position determination and thus for movement path detection in order to implement a simple teaching method.

Furthermore, it is proposed that a force acting on the handling element during a movement of the handling element along a movement path, in particular after a teaching process, is detected, in particular by means of a sensor unit of the handling device that is arranged at least partially on the handling element, preferably the sensor unit already mentioned above, in order to assess a presence of an obstacle on the movement path, wherein, if a limit value of the force acting on the handling element is exceeded, position data, in particular current position data, of the handling element are automatically stored in a memory unit of a control or regulation unit of the handling device, in particular in order to note a position of the obstacle. Preferably, the sensor unit comprises at least one force detection element for detecting a force acting on the handling element. Preferably, the force detection element is arranged at a, preferably circumferential, edge of the handling element in order to sense a force acting on the handling element in case of contact of the handling element with an obstacle. The force detection element can have any design that appears reasonable to a person skilled in the art, such as a design as a strain gauge, as a piezoelectric sensor, as a thin-film sensor, as an inductive sensor, as a capacitive sensor or the like. It is conceivable that an edge of the handling element which, viewed in the horizontal plane, surrounds the handling element, in particular completely, is elastically designed or movably mounted and a deformation, in particular elastic, or a deflection of the edge can be detected by means of the force detection element in order to detect a force acting on the handling element. Other designs for detecting a force acting on the handling element for obstacle detection that appear useful to a person skilled in the art are also conceivable. By means of the design according to the invention, an obstacle located in the movement path can be reliably detected. Advantageously, information relating to an obstacle can be output to the operator so that the operator can remove the obstacle or initiate a change in a movement path. Advantageously, a simple adaptability of the operating behavior of the handling element can be achieved. In particular, adjustments to the operating behavior of the handling element can advantageously be made easily and quickly during an ongoing operation, since, for example, an operator can directly change the operating behavior of the handling element by a direct operator interaction when an undesired action of the handling element is detected. Advantageously, a high reliability of a movement of the handling elements can be enabled.

It is further proposed that an operator interaction, in particular a successfully detected operator interaction, for teaching the operating behavior of the handling element is confirmed by the handling element by means of an optical and/or haptic output, in particular by a movement, preferably a vibration, of the handling element. The optical and/or haptic output can be, for example, a vibration, a tilting, a turning, a tracing of a confirmation path by the handling element, or an output of a light signal, an output of a projection, in particular onto at least one movement surface element, or the like. The handling element can, for example, have a light source, such as an LED, a projector or the like, for an output of a light signal and/or a projection. Alternatively or additionally, it is conceivable that the handling element has an acoustic output element which is configured for confirming an, in particular successfully detected, operator interaction for teaching the operating behavior of the handling element by means of an acoustic signal. By means of the design according to the invention, a high level of operating comfort can be achieved in a particularly advantageous manner, in particular because feedback from the handling element to the operator can be provided in an advantageous manner. Advantageously, a high acceptance of the method, which is designed independently of an additional input device, can be achieved.

In addition, a handling device, in particular the aforementioned handling device designed as a planar transport device, comprising at least one handling element designed as an electrodynamically movable mover and comprising at least one control or regulation unit, in particular the aforementioned control or regulation unit, which is configured for teaching at least one operating behavior of the handling element by means of a method according to the invention, is proposed. By means of the design according to the invention, a handling device designed as a planar transport device can be advantageously realized, which can be taught in a particularly user-friendly manner. An operator can advantageously specify movement sequences or movement distances of the handling element simply and quickly, in particular directly, on the handling element itself, in particular without having to have special programming skills for this. Advantageously, an intuitive teaching method can be made possible.

Furthermore, it is proposed that the handling device designed as a planar transport device comprises at least one movement surface element, in particular the aforementioned movement surface element, comprising in particular at least one electromagnetic drive unit, and comprising at least one sensor unit, in particular the aforementioned sensor unit, at least for detecting a position and/or a movement of the handling element relative to the movement surface element. By means of the embodiment according to the invention, a handling device designed as a planar transport device can advantageously be realized, which constructively simply enables a precise teaching method. Advantageously, existing components of the handling device designed as a planar transport device can be used for a position determination and thus for a movement path detection in order to realize a simple teaching method. An operator can advantageously specify movement sequences or movement paths of the handling element simply and quickly, in particular directly, on the handling element itself, in particular without having to have special programming skills for this. Advantageously, a teaching method that can be carried out intuitively can be made possible.

Furthermore, a production and/or transport machine comprising at least one handling device designed as a planar transport device according to the invention is proposed. The production and/or transport machine can comprise further devices and/or units which appear useful to a person skilled in the art and which can be used for handling products, in particular foodstuffs. The production and/or transport machine is preferably configured for a production, filling, packaging and/or repackaging of food products. Thus, in addition to the handling device designed as a planar transport device, the production and/or transport machine may comprise a plurality of further devices and/or units which a person skilled in the art may deem useful, such as, for example, a forming device for packages, a cutting device, a filling device, a sterilization device, a closing device, a repackaging device or the like. By means of the embodiment according to the invention, an individual sequence of movements of the handling device designed as a planar transport device adapted to a process of the production and/or transport machine can advantageously be made possible, which can be adapted in an operator-friendly manner. Advantageously, a high flexibility can be achieved with regard to a field of application of the production and/or transport machine.

The method according to the invention, the planar transport device according to the invention and/or the production and/or transport machine according to the invention shall not be limited in this respect to the application and embodiment described above. In particular, the method according to the invention, the planar transport device according to the invention and/or the production and/or transport machine according to the invention may have a number of individual elements, components and units as well as method steps deviating from a number mentioned herein for a fulfillment of a mode of operation described herein. In addition, for the value ranges stated in the present disclosure, values lying within the stated limits are also to be considered as disclosed and usable as desired.

BRIEF DESCRIPTION OF THE DRAWINGS

Further advantages can be found in the following description of the drawings. The drawings show an exemplary embodiment of the invention. The drawings, the description and the claims contain numerous features in combination. A person skilled in the art will expediently also consider the features individually and combine them to form useful further combinations.

In the drawings:

FIG. 2 shows a detailed view of the handling device according to the invention designed as a planar transport device in a schematic representation, FIG. 3a shows a movement of a handling element of the handling device designed as a planar transport device according to the invention along a straight movement path for teaching an operating behavior of the handling element in a schematic representation, FIG. 3b shows a movement path from FIG. 3a interpolated by means of a control or regulation unit of the handling device according to the invention, which is designed as a planar transport device, in a schematic representation.

DETAILED DESCRIPTION

Figure 1:
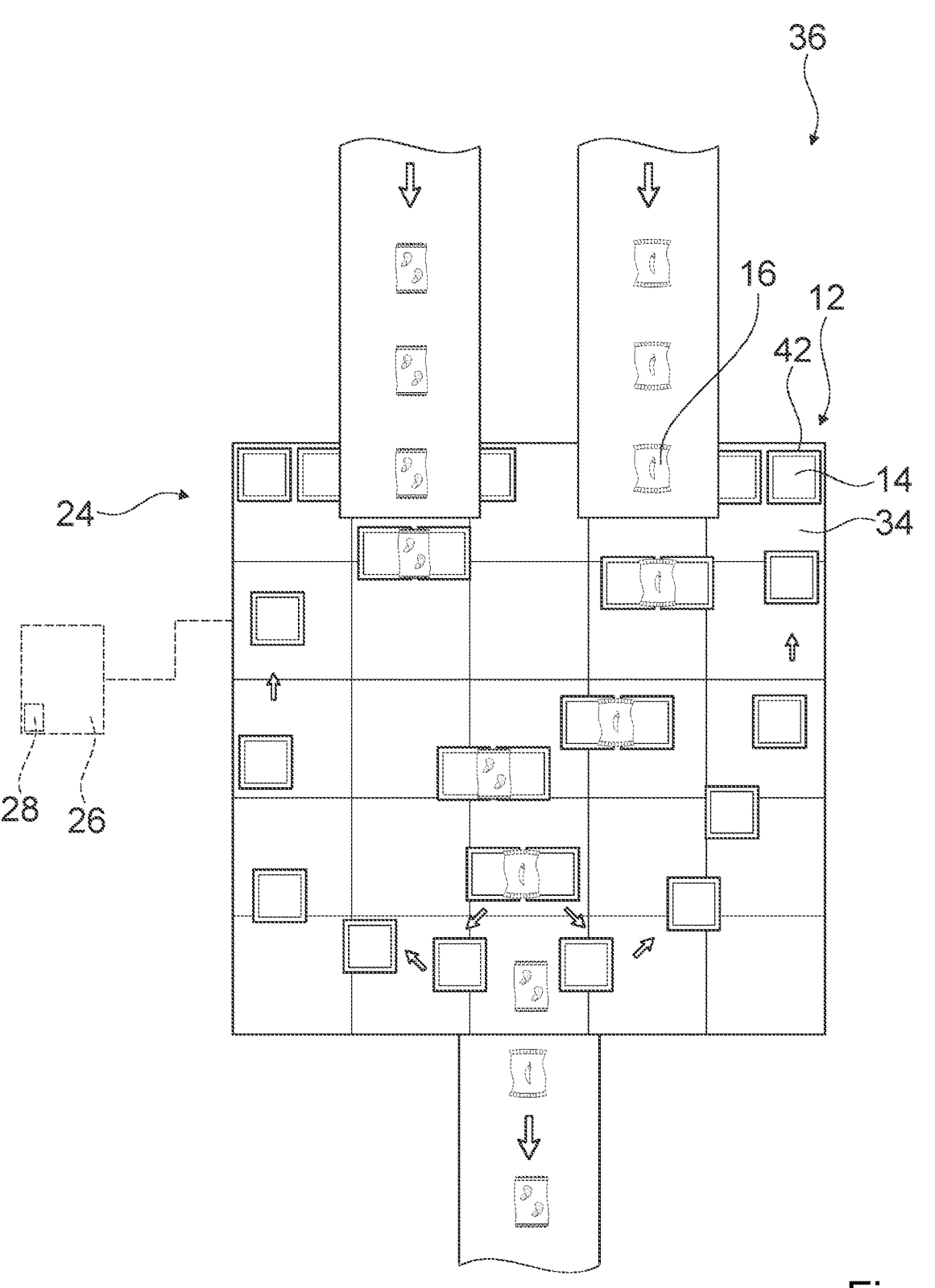
FIG. 1 shows a production and/or transport machine according to the invention with at least one handling device according to the invention designed as a planar transport device in a schematic representation.

FIG. 1 shows a production and/or transport machine 36 comprising at least one handling device 12. The production and/or transport machine 36 is preferably configured for a production, for a processing and/or for a transport of products 16, in particular foodstuffs. The production and/or transport machine 36 may be designed, for example, as a food packaging machine, as a food filling machine, as a food manufacturing machine, as a combination of the aforementioned machines, or the like. The production and/or transport machine 36 may comprise further devices and/or units which appear to a person skilled in the art to be useful for a production, processing and/or transport of products 16, in particular foodstuffs, such as, for example, a sterilization device, a filling device, a closing device, a repackaging device or the like. Preferably, the handling device 12 is configured for transporting products 16. For example, it is conceivable that the handling device 12 is configured for a transport of products 16 between individual work stations of the production and/or transport machine 36 comprising the handling device 12. The handling device 12 may be configured for an ordered transport, such as for realizing a row formation, a sorting or the like, and/or for an unordered transport.

FIG. 2 shows a detailed view of the handling device 12. The handling device 12 is preferably designed as a planar transport device. The handling device 12 comprises at least one handling element 14, in particular an electrodynamically movable mover, and at least one control or regulation unit 26, which is configured for teaching at least one operating behavior of the handling element 14 by means of a method 10 described in greater detail later. The handling device 12 preferably comprises at least one movement surface element 34, in particular comprising at least one electromagnetic drive unit 32, and at least one sensor unit 24 at least for detecting a position and/or a movement of the handling element 14 relative to the movement surface element 34. Particularly preferably, the handling device 12 comprises a plurality of handling elements 14 and a plurality of movement surface elements 34. The handling elements 14 preferably all have an at least substantially identical design, wherein in particular deviations at least in size and weights are conceivable. A description of one of the handling elements 14 is preferably transferable to all handling elements 14. The movement surface elements 34 preferably all have an at least substantially identical design, wherein in particular deviations at least in size and weights are conceivable. A description of one of the movement surface elements 34 is preferably transferable to all movement surface elements 34. The movement surface elements 34 are connected to one another, in particular in order to form together a planar movement plane (cf. FIG. 1). The movement surface elements 34 each have at least one electromagnetic drive unit 32, which is formed by at least one electric coil or several electric coils. The handling elements 14 are preferably designed as movers which are movable relative to the movement surface elements 34, in particular without contact, in particular as a result of a cooperation of permanent magnets 38 of the handling elements 14 with the electromagnetic drive units 32 of the movement surface elements 34. Preferably, the permanent magnets 38 of the handling elements 14 and the electromagnetic drive units 32 together form an electrodynamic conveyor unit or are at least part of the electrodynamic conveyor unit. In particular, the handling device 12 configured as a planar transport device can detect and evaluate a position of the individual handling elements 14 relative to the movement surface elements 34 in a manner already known to a person skilled in the art in order to realize a control or regulation of a movement of the handling elements 14 relative to the movement surface elements 34. Preferably, the handling elements 14 have six degrees of freedom of movement relative to the movement surface elements 34. Preferably, the handling elements 14 are individually translationally movable along coordinate axes X, Y and Z and are individually rotationally movable around the coordinate axes X, Y and Z relative to the movement surface elements 34. Preferably, the handling elements 14 are all independently movable relative to the movement surface elements 34. For control or regulation and for a monitoring of the movements of the handling elements 14 relative to the movement surface elements 34, the handling device 12 comprises the sensor unit 24 and the control or regulation unit 26.

Preferably, the permanent magnets 38 of the handling elements 14 together with the electromagnetic drive units 32 of the movement surface elements 34 form at least part of the sensor unit 24 of the handling device 12. Preferably, the control or regulation unit 26 forms one, in particular further part, of the sensor unit 24, in particular that part of the control or regulation unit 26 which evaluates a change in the magnetic field between handling elements 14 and the movement surface elements 34 in order to determine a position of the handling elements 14 relative to the movement surface elements 34. However, it is alternatively or additionally conceivable that the sensor unit 24 is formed entirely by the control or regulation unit 26 or is provided as a separate, additional unit to the control or regulation unit 26. Furthermore, it is alternatively or additionally conceivable that the sensor unit 24 comprises a sensor element which is designed for a special acquisition of position data, such as an acceleration sensor, a rotation rate sensor or the like.

Preferably, the sensor unit 24 comprises at least one force detection element 40 to sense a force acting on the handling element 14. Preferably, the force detection element 40 is arranged on a, preferably circumferential, edge 42 of the handling element 14 in order to sense a force acting on the handling element 14 when the handling element 14 comes into contact with an obstacle. The force detection element 40 can have any design that appears reasonable to a person skilled in the art, such as a design as a strain gauge, as a piezoelectric sensor, as a thin-film sensor, as an inductive sensor, as a capacitive sensor, or the like. It is conceivable that the edge 42 of the handling element 14, which, viewed in the horizontal plane, surrounds the handling element 14, in particular completely, is of elastic design or is mounted movably, and a deformation, in particular elastic deformation, or a deflection of the edge 42 can be detected by means of the force detection element 40 in order to detect a force acting on the handling element 14. Further embodiments for detecting a force acting on the handling element 14, in particular for detecting an obstacle, which appear to a person skilled in the art to be useful, are also conceivable. Preferably, a force acting on the handling element 14 during the movement of the handling element 14 along a movement path 18, 20, in particular after a teaching process, is detected, in particular by means of the sensor unit 24 of the handling device 12 arranged at least partially on the handling element 14, in order to assess the presence of an obstacle on the movement path 18, 20, wherein, if a limit value of the force acting on the handling element 14 is exceeded, position data, in particular current position data, of the handling element 14 are automatically stored in a memory unit 28 of the control or regulation unit 26 of the handling device 12, in particular in order to note a position of the obstacle.

Figure 4A:
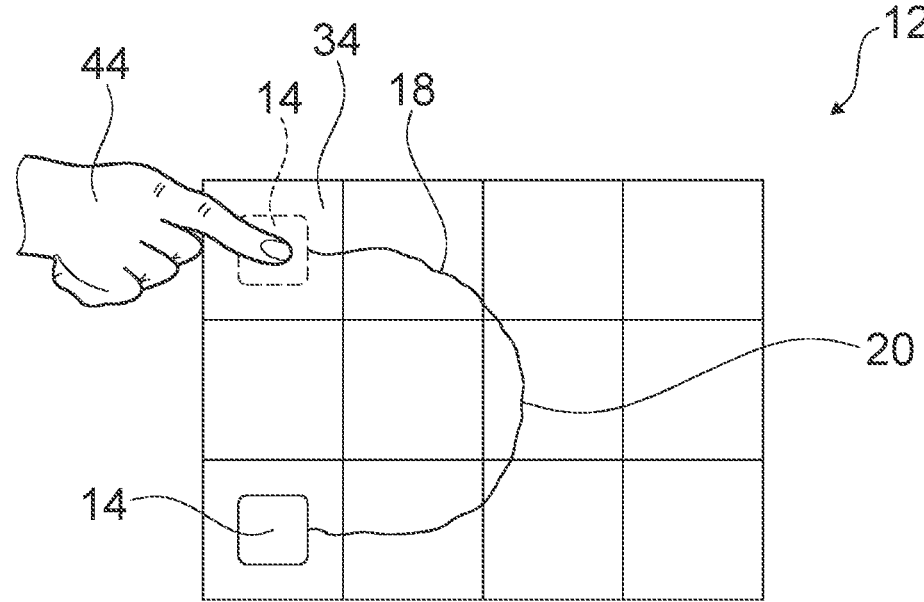
FIG. 4a shows a movement of a handling element of the handling device according to the invention, designed as a planar transport device, along an arcuate movement path for teaching an operating behavior of the handling element in a schematic representation.
Figure 4B:
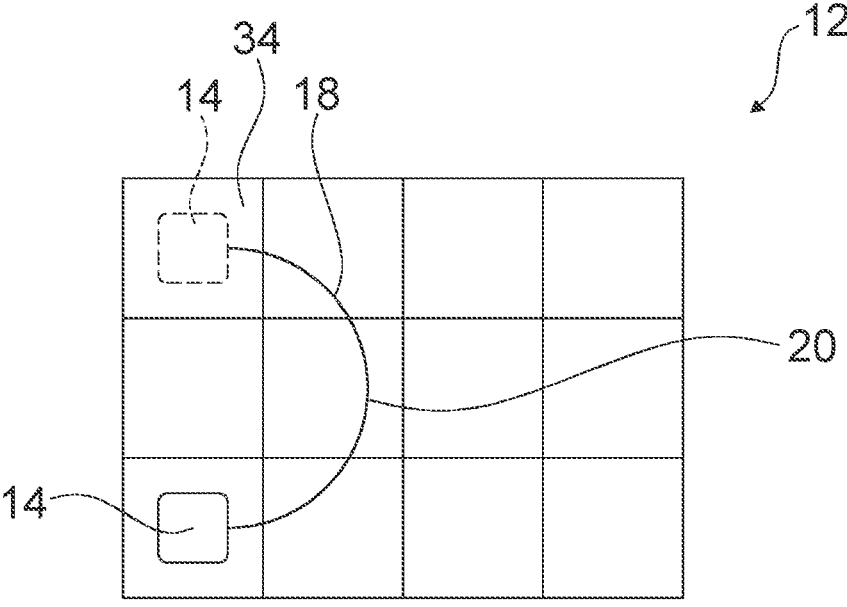
FIG. 4b shows a movement path from FIG. 4a interpolated by means of the control or regulation unit of the handling device according to the invention, which is designed as a planar transport device, in a schematic representation.

For teaching an operating behavior of the handling element 14, the handling element 14 is manually movable by an operator in a teaching process. FIGS. 3a and 4a show examples of moving the handling element 14 along a straight and a curved movement path 18, 20 for teaching the operating behavior of the handling element 14. Preferably, the handling element 14 is moved directly by an operator interaction of the operator, in particular by the operator moving the handling element 14 by means of an extremity 44 of the operator, in particular a hand or a finger, which is greatly enlarged in FIGS. 3a and 4a, in particular relative to the movement surface element 34. Preferably, the operator interaction to preset the operational behavior is a movement of the handling element 14 relative to the movement surface elements 34 by the operator, wherein the operator preferably touches the handling element 14 directly or indirectly, in particular via an auxiliary element. For example, in particular in a teaching process, a movement and/or a movement sequence of the handling element 14, which the handling element 14 performs during a regular operation, is/are taught by means of an active movement of the handling element 14 by the operator relative to the movement surface elements 34. The operator, in particular in the teaching process, for example by moving, in particular pushing or pulling, the handling element 14, can specify a movement path 18, 20, as is shown by way of example in FIGS. 3a and 4a, of the handling element 14, which the handling element 14 travels during a regular operation. For example, by rotating the handling element 14 around a movement axis 22 (cf. FIG. 2), the operator, in particular in the teaching process, can specify a speed of the handling element 14 at which the handling element 14 moves along the specified movement path 18, 20 during regular operation. It is also conceivable that a fine adjustment of the movement path 18, 20 or the speed can be made by the operator by tapping the handling element 14, in particular laterally, preferably at least substantially parallel to a horizontal plane and/or a surface of the handling element 14 and/or the movement surface elements 34. Preferably, the operator contacts the handling element 14 directly to move the handling element 14 to a specification of an operating behavior, in particular to push, pull, rotate, lift and/or press down the handling element 14 relative to the movement surface element 34. It is conceivable that for moving the handling element 14, the additional element (not shown in more detail here), such as a type of handle, guide rod or the like, that can be arranged on the handling element 14 is used. The additional element can be used for advantageously gripping and/or guiding the handling element 14 during the teaching process. Preferably, the additional element is not arranged on the handling element 14 in regular operation. The handling element 14 may comprise a connection interface (not shown in greater detail here), which is configured for a detachable mechanical connection to the additional element. The connection interface can be designed as a plug-in connection, as a screw connection, as a clamp connection, as a Velcro connection, as a bayonet connection or as any other connection interface that appears to be useful to a person skilled in the art. Preferably, the connection interface is free of electronic and/or electrical contacts. The connection interface may be partially or completely formed by a product receiving unit or may be arranged in addition thereto on the handling element 14. However, it is also conceivable that the additional element is arranged in a stowable manner on the handling element 14, for example as the result of a movable mounting of the additional element on the handling element 14. The additional element can, for example, be movably mounted on the handling element 14 in a foldable, pivotable, retractable or similar manner. Preferably, an operator interaction configured as manual movement of the handling element 14 is detected by means of the sensor unit 24 of the handling device 12, preferably interpolated, and, in particular following the interpolation, stored as a program command/operating command in the memory unit 28 of the control or regulation unit 26. FIGS. 3b and 4b show the movement paths 18, 20 from FIGS. 3a and 4a interpolated by means of the control or regulation unit 26.

Preferably, the teaching process is started or ended by moving the handling element 14, in particular manually, preferably by the operator, in particular along a vertical direction 30 (cf. FIG. 2), relative to the movement surface element 34 of the handling device 12, in particular comprising at least the electromagnetic drive unit 32. The, in particular successfully detected, operator interaction for teaching the operating behavior of the handling element 14 is preferably confirmed by the handling element 14 by means of a visual and/or haptic output, in particular by a movement, preferably a vibration, of the handling element 14. Preferably, a movement, in particular a manual movement, preferably performed by the operator, of the handling element 14 along the movement path 18, 20 and/or around the movement axis 22 is detected by means of the sensor unit 24 of the handling device 12, in particular arranged at least partially on the handling element 14, and is converted by means of the control or regulation unit 26 of the handling device 12 into an electronic command which is stored in the memory unit 28 of the control or regulation unit 26 as part of an operating program for control or regulation of the operating behavior of the handling element 14. For a detection of position data of the handling element 14, which are used for a detection of the movement path 18, 20 of the handling element 14, a change in a magnetic field, in particular in an electromagnetic field, is evaluated. The movement, in particular manual movement, preferably performed by the operator, of the handling element 14 along the movement path 18, 20 and/or around the movement axis 22 is preferably detected by means of the sensor unit 24 of the handling device 12, in particular arranged at least partially on the handling element 14, and interpolated by means of the control or regulation unit 26 of the handling device 12, in particular before storage as part of an operating program in the memory unit 28 of the control or regulation unit 26.

Figure 5:
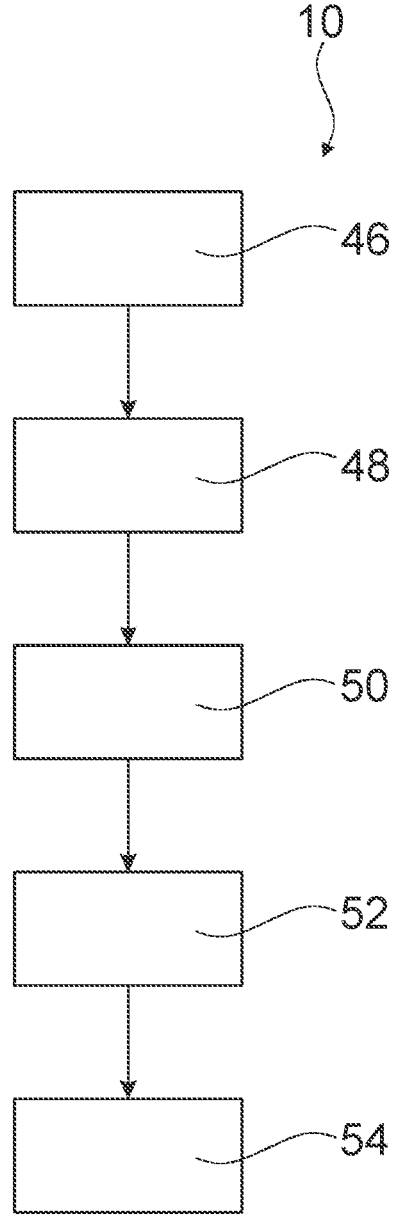
FIG. 5 shows a process sequence of a method according to the invention for teaching the handling device designed as a planar transport device according to the invention in a schematic representation.

FIG. 5 shows a schematic process flow of the method 10 for teaching the handling device 12, in particular the handling elements 14. In the method 10 for teaching the handling device 12, an operating behavior of the handling element 14, which is configured for handling products 16, is taught by means of the operator interaction of the operator, which is in particular designed differently from a manual writing of a programming command. The operator interaction takes place, in particular directly, preferably free of an additional, in particular electronic, operator input device, at the handling element 14 in order to specify the operating behavior of the handling element 14. In at least one method step 46 of the method 10, the teaching process is started, in particular by moving the handling element 14 along the vertical direction 30 relative to the movement surface element 34. Preferably, in at least one method step 48 of the method 10, the handling element 14 is moved, in particular manually, preferably by the operator, along the movement path 18, 20 and/or around the movement axis 22, the movement being detected by means of the sensor unit 24 and processed by means of the control or regulation unit 26. It is conceivable that the, in particular successfully detected, operator interaction, in particular each time, is confirmed directly by the handling element 14 by means of an optical and/or haptic output, in particular by a movement, preferably a vibration, of the handling element 14. Preferably, in at least one method step 50 of the method 10, an automatic interpolation of the predetermined movement paths 18, 20 is performed by means of the control or regulation unit 26. Preferably, in at least one method step 52 of the method 10, a fine adjustment of the predetermined movement paths 18, 20 or a presetting of a speed of the handling element 14 is performed, in particular by an operator interaction or by a program routine. Preferably, in at least one method step 54 of the method 10, the teaching process is terminated, in particular by moving the handling element 14 along the vertical direction 30 relative to the movement surface element 34. The method 10 can have further method steps that appear useful to a person skilled in the art, in particular derived on the basis of the description of the mode of operation and/or the design of the handling device 12 and/or the production and/or transport machine 36.

The invention claimed is:

1. A method for teaching a planar transport device, wherein in at least one method step an operating behavior of at least one handling element of the planar transport device, which is configured as an electrodynamically movable mover and is configured for a handling of products, is taught by an operator interaction of an operator, wherein the operator interaction is configured differently from a manual writing of a programming command, wherein the operator interaction takes place directly at the handling element in order to specify the operating behavior of the handling element, wherein in at least one further method step a change in a magnetic field is evaluated for a detection of position data of the handling element, which are used for a detection of a movement path of the handling element.

2. The method as claimed in claim 1, wherein a movement of the handling element along a movement path and/or around a movement axis is detected by a sensor unit of the planar transport device, and is converted by a control or regulation unit of the planar transport device into an electronic command, which is stored in a memory unit of the control or regulation unit as part of an operating program for a control or a regulation of the operating behavior of the handling element.

3. The method as claimed in claim 1, wherein a movement of the handling element along a movement path and/or around a movement axis is detected by a sensor unit of the planar transport device, and is interpolated by a control or regulation unit of the planar transport device.

4. The method as claimed in claim 1, wherein a teaching process is started or ended by a movement of the handling element relative to a movement surface element of the planar transport device.

5. The method as claimed in claim 1, wherein a force acting on the handling element during a movement of the handling element along a movement path is detected in order to assess a presence of an obstacle on the movement path, wherein if a limit value of the force acting on the handling element is exceeded, position data of the handling element are automatically stored in a memory unit of a control or regulation unit of the planar transport device.

6. The method as claimed in claim 1, wherein an operator interaction for teaching the operating behavior of the handling element is confirmed by the handling element by an optical and/or haptic output of the handling element.

7. A planar transport device comprising at least one handling element configured as an electrodynamically movable mover and comprising at least one control or regulation unit which is configured for teaching at least one operating behavior of the handling element by the method as claimed in claim 1.

8. The planar transport device as claimed in claim 7, comprising at least one movement surface element, comprising at least one electromagnetic drive unit, and at least one sensor unit at least for detecting a position and/or a movement of the handling element relative to the movement surface element.

9. A production and/or transport machine comprising at least one planar transport device as claimed in claim 7.

10. A method for teaching a planar transport device, wherein in at least one method step an operating behavior of at least one handling element of the planar transport device, which is configured as an electrodynamically movable mover and is configured for a handling of products, is taught by an operator interaction of an operator, wherein the operator interaction is configured differently from a manual writing of a programming command, wherein the operator interaction takes place directly at the handling element in order to specify the operating behavior of the handling element, wherein in at least one further method step a force acting on the handling element during a movement of the handling element along a movement path is detected in order to assess a presence of an obstacle on the movement path, wherein if a limit value of the force acting on the handling element is exceeded, position data of the handling element are automatically stored in a memory unit of a control or regulation unit of the planar transport device.

* * * * *